UNITED STATES PATENT OFFICE.

RUDOLF RUSTERHOLZ, OF NEW YORK, ASSIGNOR OF ONE-HALF TO ROBERT MÄGE, OF KATONA, WESTCHESTER COUNTY, NEW YORK.

INSECTICIDE.

SPECIFICATION forming part of Letters Patent No. 329,594, dated November 3, 1885.

Application filed August 1, 1885. Serial No. 173,231. (No specimens.)

*To all whom it may concern:*

Be it known that I, RUDOLF RUSTERHOLZ, of the city, county, and State of New York, have invented certain new and useful Improvements in Insecticides, of which the following is a specification.

This invention has reference to an insecticide the object of which is to destroy bed-bugs and their eggs; and the invention consists of a solution of salicylic acid, bicarbonate of soda, starch, perchloride of iron, spirits of ammonia, and a suitable flavoring-oil, in the proportions hereinafter set forth, to wit:

Fifteen parts of salicylic acid are dissolved in a solution of five parts of bicarbonate of soda and mixed with five parts of starch dissolved in hot water. Fifteen parts of perchloride of iron and fifteen-twentieths part of spirits of ammonia and three parts of essence of anise-seed or a flavoring-oil are then added to the solution and mixed with forty parts of water.

The solution has to be kept well corked. For use it is applied by a brush to the furniture infested with bed-bugs. The iron and ammonia kill the live bugs, while the eggs are killed by the solution, as it permeates the same and destroys the breed. The salicylic acid acts as a preservative for the solution, the soda and starch impart body to the same, while the perchloride of iron and ammonia act as the destroying agents.

Having thus described my invention, I claim as new and desire to secure by Letters Patent—

An insecticide consisting of a solution of salicylic acid, bicarbonate of soda, starch, perchloride of iron, spirits of ammonia, and a flavoring-oil, in the proportions and for the purpose set forth.

In testimony that I claim the foregoing as my invention I have signed my name in presence of two subscribing witnesses.

RUDOLF RUSTERHOLZ.

Witnesses:
PAUL GOEPEL,
MARTIN PETRY.